(12) United States Patent
Frederiksen

(10) Patent No.: US 7,231,917 B2
(45) Date of Patent: Jun. 19, 2007

(54) GAS-FIRED COOKING APPARATUS WITH CONTROL OF COOKING TEMPERATURE

(75) Inventor: Niels Frederiksen, Herlev (DK)

(73) Assignee: Cavagna Group Switzerland S.A. (CH)

( * ) Notice: Subject to any disclaimer, the term of this patent is extended or adjusted under 35 U.S.C. 154(b) by 113 days.

(21) Appl. No.: 10/702,831

(22) Filed: Nov. 6, 2003

(65) Prior Publication Data
US 2005/0098169 A1    May 12, 2005

(51) Int. Cl.
*F24C 3/12* (2006.01)
(52) U.S. Cl. .............................. 126/39 G; 126/39 BA
(58) Field of Classification Search .............. 126/39 G, 126/39 BA, 41 R
See application file for complete search history.

(56) References Cited
U.S. PATENT DOCUMENTS

| | | | | |
|---|---|---|---|---|
| 3,411,710 A | * | 11/1968 | Willson | 236/15 A |
| 4,492,336 A | * | 1/1985 | Takata et al. | 236/20 A |
| 5,171,974 A | * | 12/1992 | Koether et al. | 219/506 |
| 5,429,111 A | * | 7/1995 | Akamatsu | 126/52 |
| 5,611,327 A | * | 3/1997 | Teixeira Filho et al. | 126/39 R |
| 5,975,884 A | * | 11/1999 | Dugger | 431/42 |

* cited by examiner

*Primary Examiner*—Alfred Basichas
(74) *Attorney, Agent, or Firm*—Cantor Colburn LLP

(57) ABSTRACT

A gas-fired cooking apparatus, comprising a cooking compartment inside which one or more burners are inserted, gas supply source being suitable to supply gas to the one or more burners, further comprising elements for regulating the flow of gas that arrives from the gas supply source arranged in series between the gas supply source and the one or more burners, a control element being adapted to detect internal and external temperature conditions of the cooking compartment in order to regulate the flow of gas through the regulator elements, to one or more burners, so as to maintain the cooking temperature constant at a value preset by the user.

6 Claims, 2 Drawing Sheets

GAS-FIRED COOKING APPARATUS WITH CONTROL OF COOKING TEMPERATURE

BACKGROUND OF THE INVENTION

The present invention relates to a gas-fired cooking apparatus with accurate control of the cooking temperature. More particularly, the invention relates to a gas-fired cooking apparatus, such as for example a grill or barbecue, with accurate control of the cooking temperature.

As is known, gas-fired cooking apparatuses, such as for example grills or barbecues, are designed with one or more burners arranged inside a closed compartment, which furthermore contains means suitable to support the food during cooking.

The lighting of the gas that supplies the burners and the setting of the burner to control the temperature inside the cooking compartment are performed manually by pressing a button or turning a knob.

Moreover, the user must constantly check the temperature of the cooking compartment and the cooking time itself in order to achieve an acceptable cooking result.

Any external interference, such as wind or a change in ambient temperature, is not compensated unless the user performs such compensation manually.

Furthermore, if the flame of the burner goes out for any reason, there is no device suitable to interrupt the flow of gas.

SUMMARY OF THE INVENTION

The aim of the present invention is to provide a gas-fired cooking apparatus that has accurate and optimized control of the cooking temperature.

Within this aim, an object of the present invention is to provide a gas-fired cooking apparatus that can maintain the cooking temperature at a value set by the user.

Another object of the present invention is to provide a gas-fired cooking apparatus that is capable of compensating for any changes due to ambient temperature or external interference, in order to keep constant the cooking temperature.

A further object of the present invention is to provide a gas-fired cooking apparatus provided with safety functions for the user.

A still further object of the present invention is to provide a gas-fired cooking apparatus that is highly reliable and relatively simple to manufacture and has competitive costs.

This aim and these and other objects that will become better apparent hereinafter are achieved by a gas-fired cooking apparatus, comprising a cooking compartment inside which one or more burners are inserted, gas supply means being adapted to supply gas to said one or more burners, characterized in that it comprises means, for regulating the flow of gas that arrives from said gas supply means arranged in series between said gas supply means and said one or more burners, control means being adapted to detect internal and external temperature conditions of said cooking compartment in order to regulate the flow of gas through said regulator means, to said one or more burners, so as to maintain the cooking temperature constant at a value preset by the user.

BRIEF DESCRIPTION OF THE DRAWINGS

Further characteristics and advantages of the invention will become better apparent from the description of a preferred but not exclusive embodiment of the apparatus according to the present invention, illustrated by way of non-limitative example in the accompanying drawings, wherein.

DESCRIPTION OF THE PREFERRED EMBODIMENTS

Figure 1:
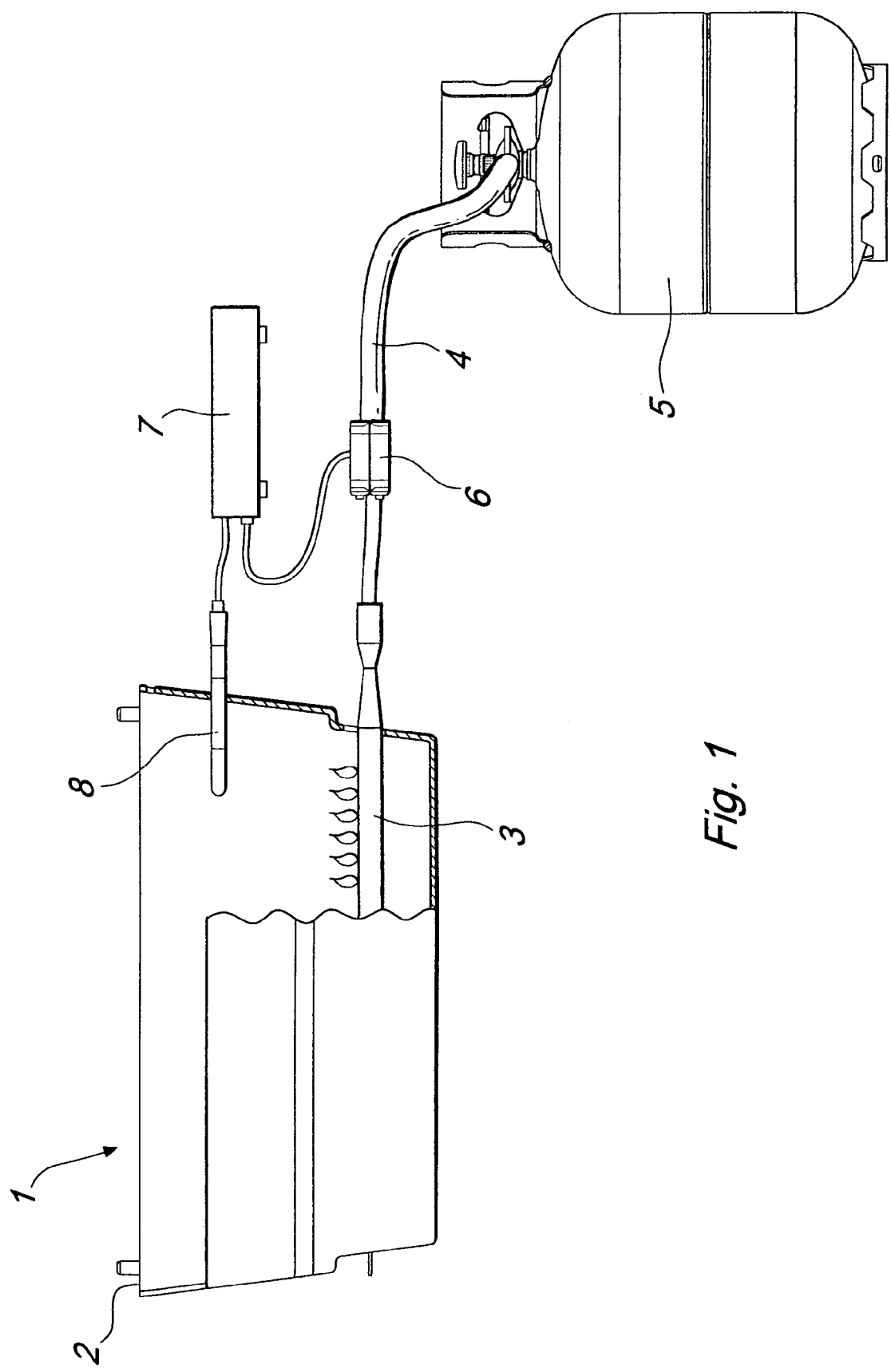
FIG. 1 is a schematic view of the gas-fired cooking apparatus according to the present invention, with temperature control.

With reference to the figures, the apparatus according to the present invention, generally designated by the reference numeral 1, comprises a compartment 2 that is suitable to contain the foods to be cooked and is provided internally with at least one gas-fired burner 3. The gas-fired burner is connected, by means of such as for example a hose 4, to gas supply means, such as for example a gas cylinder 5 provided with a regulator.

The particularity of the invention consists in that between the burner 3 and the gas cylinder 5 there are means for regulating the flow of gas, designated by the reference numeral 6, which are conveniently constituted for example by an electrically controlled valve that is opened and closed according to the requirements, as described in detail hereinafter.

Control means 7 are provided conveniently in order to drive the opening and closure of the electric valve 6.

The control means 7 are for example microprocessor-based control means, which comprise a microprocessor that is part of a closed circuit and is suitable to receive as feedback a temperature signal that arrives from temperature measuring means 8 located so as to detect the internal temperature of the cooking compartment 2.

Figure 2:
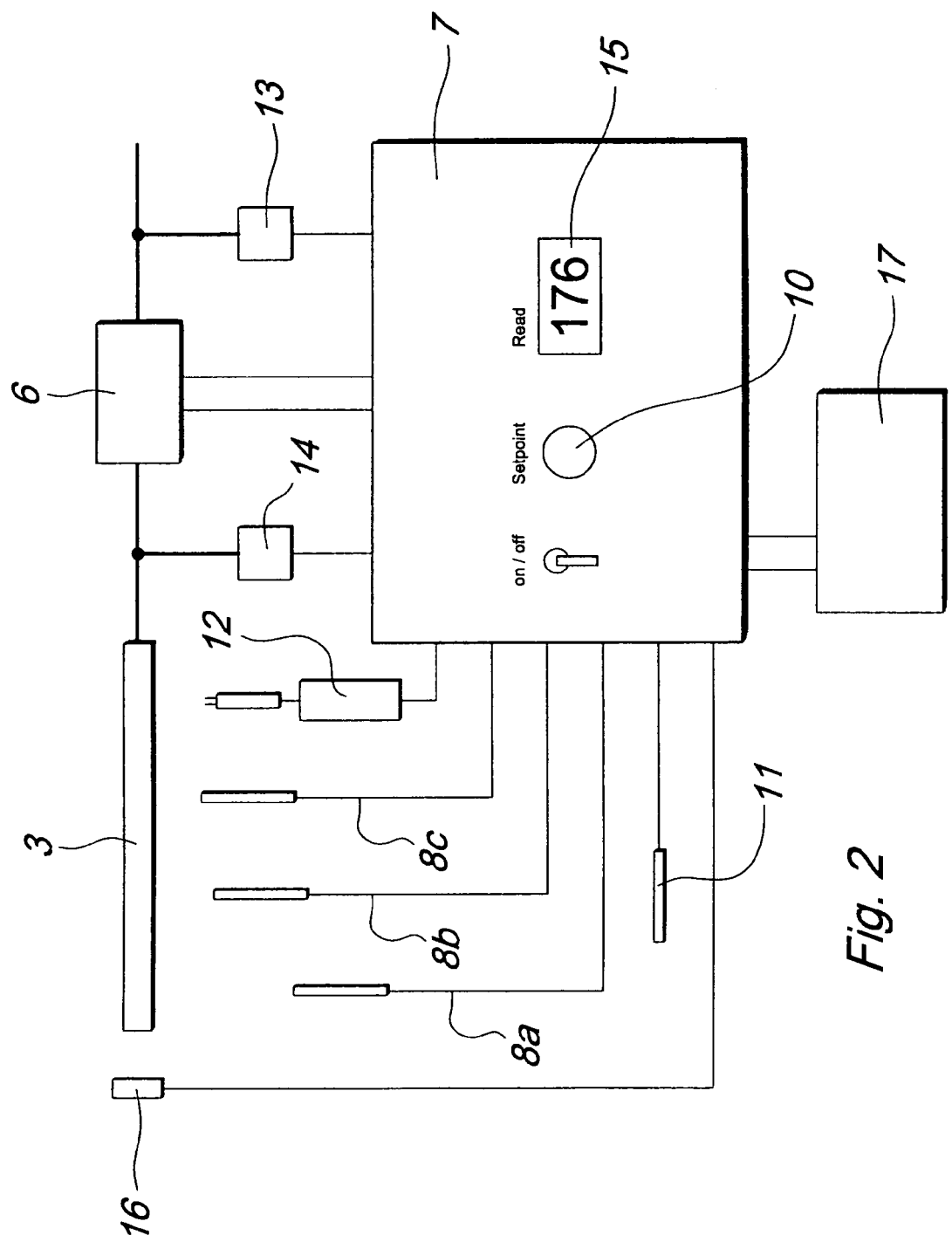
FIG. 2 is a schematic view of the temperature control device used in the apparatus shown in FIG. 1.

The control means 7 are provided with means for setting the intended cooking temperature, designated by the reference numerals 10 in FIG. 2, and with display means 15 that are suitable to display the temperature set by the user.

Conveniently, the microprocessor-based control means 7, as mentioned, are provided with means 8 for detecting the internal temperature of the compartment 2 of the cooking apparatus. Such temperature sensing means 8 are divided into means 8a for measuring the temperature of the food to be cooked, means 8b for measuring the internal temperature of the oven, and means 8c for measuring the temperature of the flame; there are also means 11 for measuring the ambient temperature.

The microprocessor-based control means are furthermore provided with means 16 for indicating the opening of the lid of the compartment 2 and with pressure transducer means 13 and 14 that are respectively suitable to detect a pressure upstream of the regulator valve 6 and downstream of said valve.

Moreover, the control means 7 are capable of emitting suitable alarms if the signals from said measurement means indicate an anomaly in the operation of the apparatus.

The operation of the apparatus according to the present invention is substantially as follows.

The operator sets the intended cooking temperature on the control means 7, and the control means 7 ensure that this set temperature is kept constant throughout the cooking cycle of the food inserted in the cooking compartment 2.

By means of a comparison, the microprocessor (or equivalent means) of the microprocessor-based control means 7 compares the current temperature of the cooking compartment 2, by way of signals that arrive from the measurement means 8a, 8b, 8c and from the measurement means 11, with the temperature preset by the user, i.e., the cooking temperature set by virtue of the setting means 10.

The result of the comparison performed between the set temperature and the actual temperature allows to send to the electrically controlled valve 6 an opening or closure signal in order to reduce or increase the flow of gas that arrives from the cylinder of gas 5 and is directed toward the burner 3.

The variation in the opening of the valve 6 therefore allows, with the valve inserted in series between the gas cylinder 5 and the burner or burners 3, to regulate the consumption of the burner electronically instead of manually.

The feedback related to the actual temperature inside the compartment 2, sent to the control means 7, is managed by the measurement means 8a–8c or sensors.

Furthermore, the control means 7 are designed to enter a safe mode if the flame of the burner goes out, the lid of the cooking compartment 2 is opened, or the pressure of the gas downstream and/or upstream of the valve 6 exceeds preset values. The safe mode can be configured as an interruption of the flow of gas or as a control of the level of the flame.

The present invention also relates to a device for controlling the cooking temperature of a gas-fired cooking apparatus, such device being constituted by the control means 7, by the electrically controlled valve 6 arranged in series between the burner 3 of the gas-fired cooking apparatus and the gas cylinder 5, and by a plurality of means for measuring conditions both inside the cooking compartment 2 of the gas-fired cooking apparatus and outside such compartment.

The control means 7 are for example conveniently powered by battery-based power supply means 17.

In practice it has been found that the apparatus according to the present invention fully achieves the intended aim and objects, since it allows to achieve optimum cooking of food by virtue of a constant control of the cooking temperature and of environmental conditions, in order to regulate the cooking temperature so that it always coincides the temperature set by the user.

Furthermore, the apparatus according to the invention allows to enter a safe mode if abnormal operation, varying from the intended operating parameters, is detected.

The apparatus thus conceived is susceptible of numerous modifications and variations, all of which are within the scope of the appended claims; all the details may furthermore be replaced with other technically equivalent elements.

In practice, the materials used, as well as the dimensions and the contingent shapes, may be any according to the requirements and the state of the art.

What is claimed is:

1. A gas-fired cooking apparatus, comprising a cooking compartment inside which one or more burners are inserted, gas supply means being suitable to supply gas to said one or more burners, further comprising regulator means for regulating a flow of gas that arrives from said gas supply means arranged in series between said gas supply means and said one or more burners, control means being adapted to detect internal and external temperature conditions of said cooking compartment in order to regulate the flow of gas through said regulator means, to said one or more burners, so as to maintain the cooking temperature constant at a value preset by the user, wherein said means for measuring the internal and external condition of said cooking compartment comprises means for measuring the temperature of the food to be cooked, means for measuring the temperature of the inside of the compartment, means for measuring the temperature of the flame emitted from the burner, and means for measuring the ambient temperature.

2. The apparatus according to claim 1, wherein said means for measuring the external conditions of said apparatus comprise means for measuring ambient temperature and means for measuring pressure downstream and upstream of said gas flow regulator means.

3. The apparatus according to claim 1, characterized in that said control means are provided with means for setting the preset cooking temperature and display means suitable to display said preset temperature.

4. The apparatus according to claim 1, wherein said control means receive in input a signal from means suitable to detect opening of the lid of said cooking compartment.

5. The apparatus according to claim 1, wherein said regulator means for regulating the flow of gas that arrives from said gas supply means comprise an electrically controlled valve.

6. The apparatus according to claim 1, wherein said microprocessor-based control means are battery-powered.

* * * * *